(12) United States Patent
Yoshimine

(10) Patent No.: US 7,660,045 B2
(45) Date of Patent: Feb. 9, 2010

(54) OBJECT LENS AND CONDENSER

(76) Inventor: Takashi Yoshimine, 5-3-107, Minami-cho, Toda-shi, Saitama, 335-0025 (JP)

( * ) Notice: Subject to any disclaimer, the term of this patent is extended or adjusted under 35 U.S.C. 154(b) by 485 days.

(21) Appl. No.: 10/568,424

(22) PCT Filed: Nov. 24, 2004

(86) PCT No.: PCT/JP2004/017427
§ 371 (c)(1),
(2), (4) Date: Feb. 14, 2006

(87) PCT Pub. No.: WO2006/057033
PCT Pub. Date: Jun. 1, 2006

(65) Prior Publication Data
US 2008/0192340 A1    Aug. 14, 2008

(51) Int. Cl.
*G02B 21/02* (2006.01)
*G02B 26/02* (2006.01)
(52) U.S. Cl. .................. 359/656; 359/387; 359/227; 359/236
(58) Field of Classification Search ......... 359/368–390, 359/601–615, 656–661, 227–236
See application file for complete search history.

(56) References Cited

U.S. PATENT DOCUMENTS
2007/0127117 A1 * 6/2007 Vodyanoy et al. ........... 359/385

FOREIGN PATENT DOCUMENTS
| DE | 34 09 657 A1 * | 9/1985 | ................ 359/387 |
| JP | 60-225817 A | 11/1985 | |
| JP | 03-157609 A | 7/1991 | |
| JP | 09-068655 A | 3/1997 | |
| JP | 10-031164 A | 2/1998 | |
| JP | 10-039227 A | 2/1998 | |

* cited by examiner

*Primary Examiner*—Thong Nguyen
(74) *Attorney, Agent, or Firm*—Rader, Fishman & Grauer, PLLC

(57) ABSTRACT

An object lens includes a first optical system that obtains a magnified image of an object, a second optical system that guides dark field illumination light to the object, a barrel that contains the first optical system and the second optical system and has an optical path around the first optical system for the dark field illumination light, and a shield mechanism that is disposed on the optical path and that varies the incident area of the dark field illumination light to shield the dark field illumination light.

12 Claims, 12 Drawing Sheets

FIG. 7
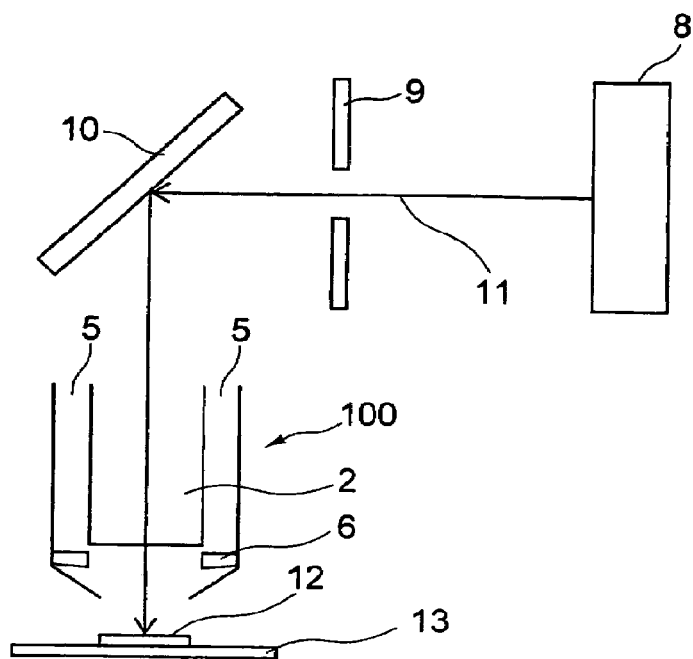
FIG.7A
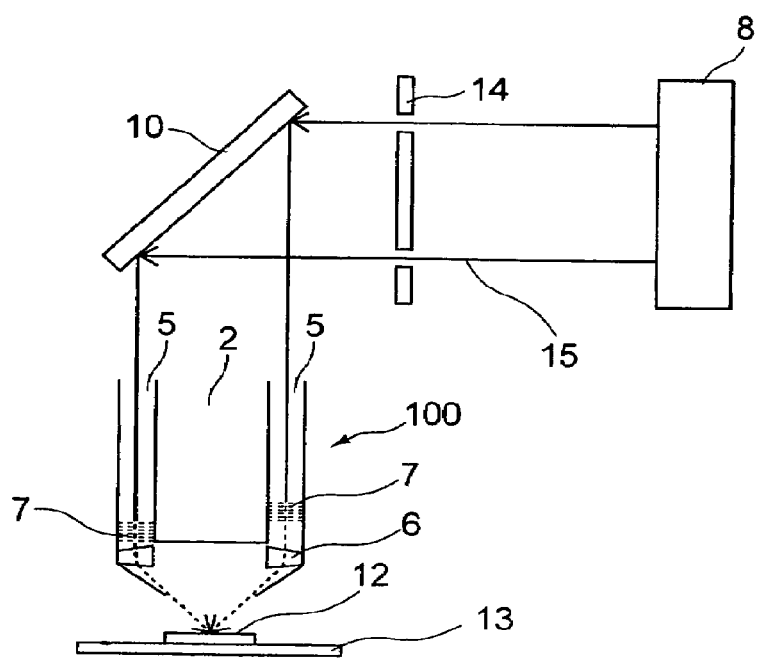
FIG.7B

FIG. 8
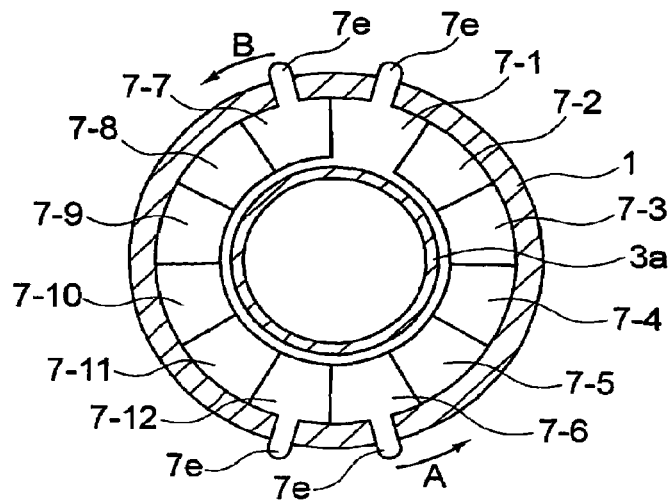
FIG. 8A
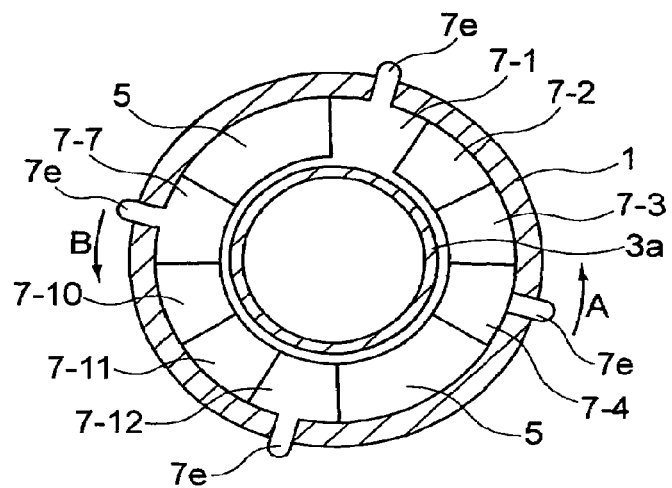
FIG. 8B
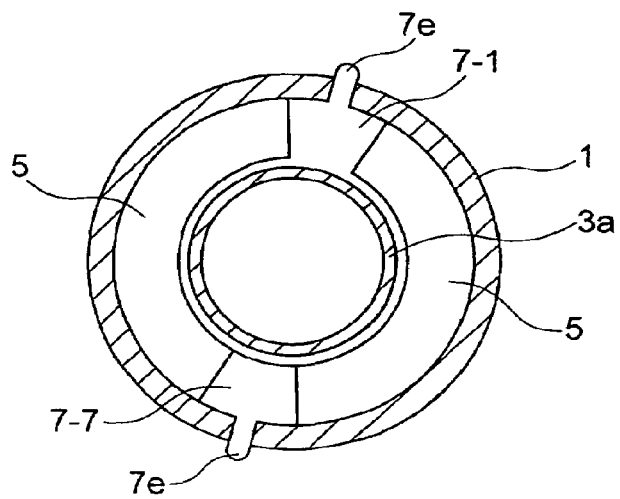
FIG. 8C

FIG. 9
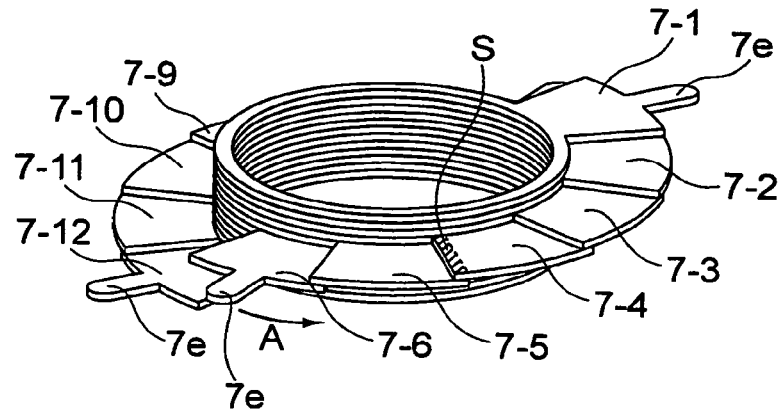
FIG.9A
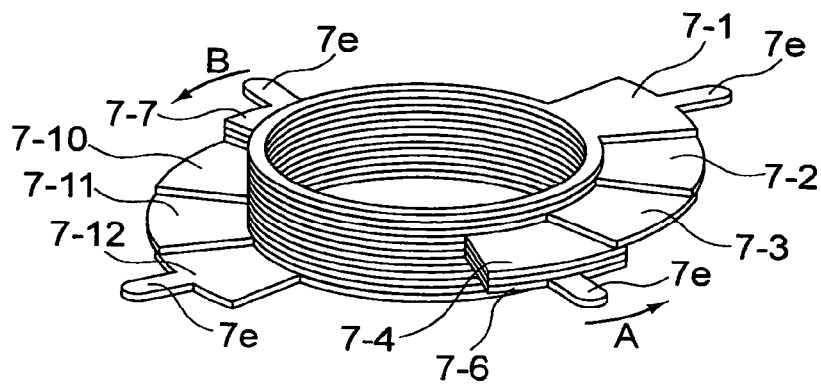
FIG.9B
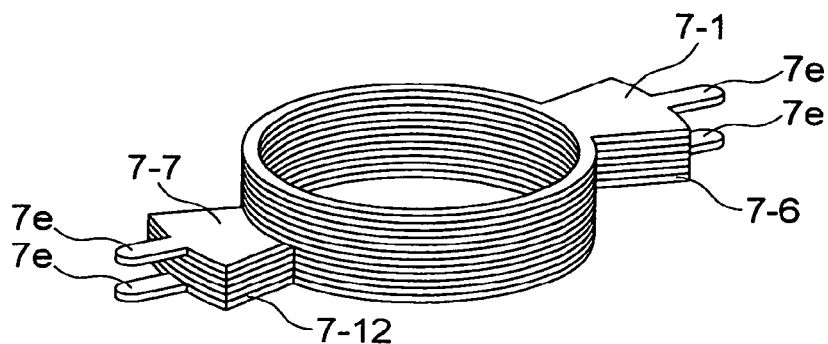
FIG.9C

FIG.10
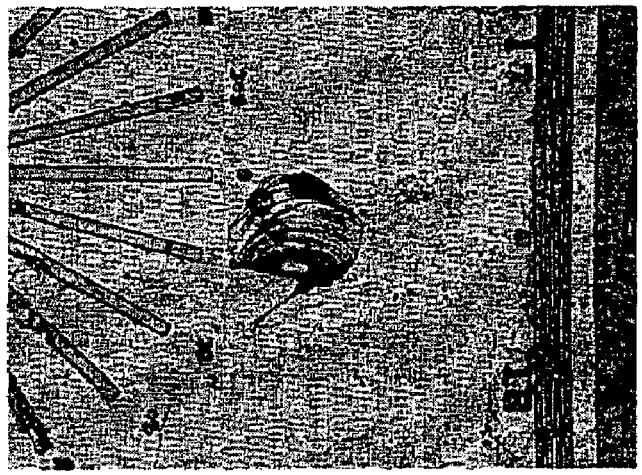
FIG.10A
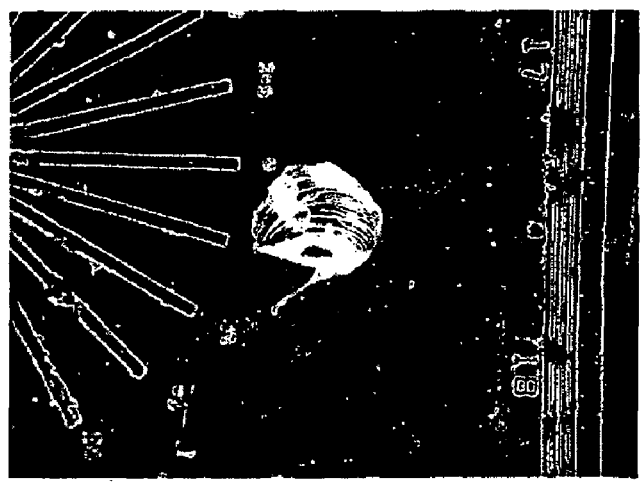
FIG.10B
(Prior Art)

FIG. 11
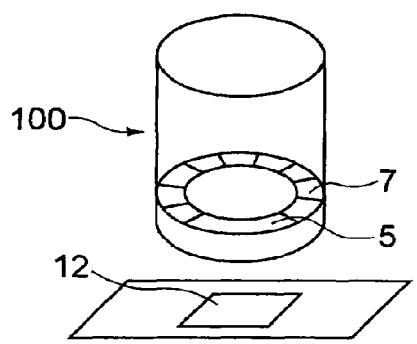 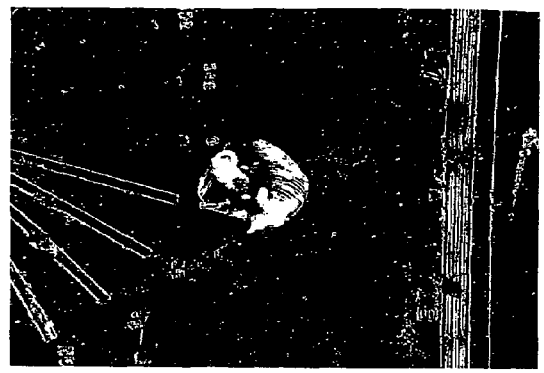
FIG.11A
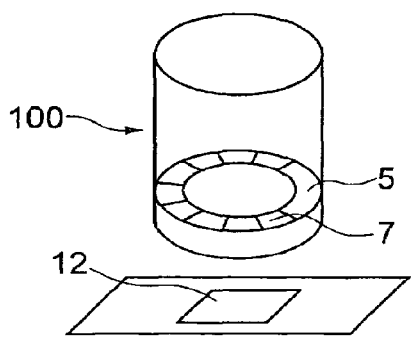 
FIG.11B
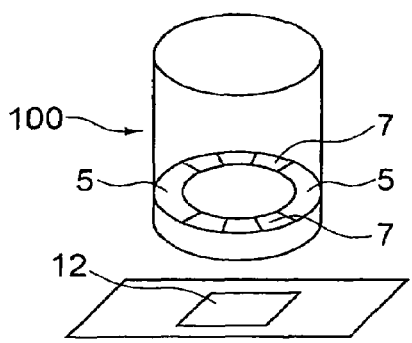 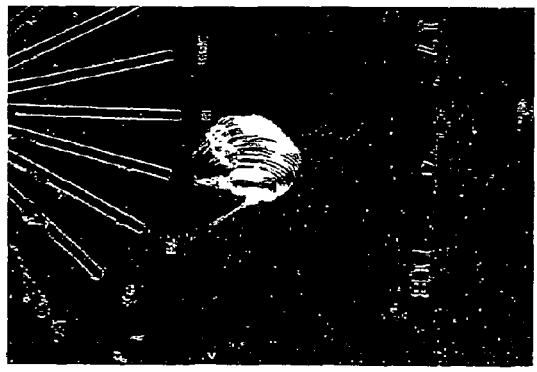
FIG.11C

OBJECT LENS AND CONDENSER

BACKGROUND OF THE INVENTION

1. Field of the Invention

The present invention relates to an object lens and a condenser that is mounted on a microscope and that can be used for dark field observation.

2. Description of the Related Art

Object lens and condensers mounted on microscopes and so forth have been used for not only regular bright field observation, but dark field observation. The dark field observation is performed by supplying a light beam from the periphery of an optical system such as an object lens or a condenser lens and guiding the light beam to the surface of an object. Thus, the dark field observation can be performed for samples that have flaws, foreign matter, unevenness, gap, or low reflectivity that cannot be observed by the bright field observation (for example, see FIG. 1 and so forth of Japanese Patent Application Laid-Open Publication NO. SHO 60-225817).

SUMMARY OF THE INVENTION

However, when the dark field observation is performed with an object lens or a condenser, since a ring-shaped light beam is equally emitted from the periphery of the optical system, not only a portion that has microscopic flaws and foreign matter but also directional flaws cannot be detected.

BRIEF DESCRIPTION OF THE DRAWINGS

FIG. 7 are schematic diagrams showing the state of which illumination light is emitted from a light source to an object through the object lens 100.

FIG. 8 are top views of the object lens 100 showing states of which the shield plates 7 are opened/closed stepwise.

FIG. 9 are perspective views showing the states of which the shield plates 7 are opened/closed stepwise.

FIG. 10 are schematic diagrams showing observed images of a circuit board when the normal bright field observation and the dark field observation are performed.

FIG. 11 are schematic diagrams showing the open positions of the shield plates 7 and observed images of a circuit board when the dark field observation is performed by varying the open positions and open areas of the shield plates 7.

DETAILED DESCRIPTION OF THE INVENTION

Figure 1:
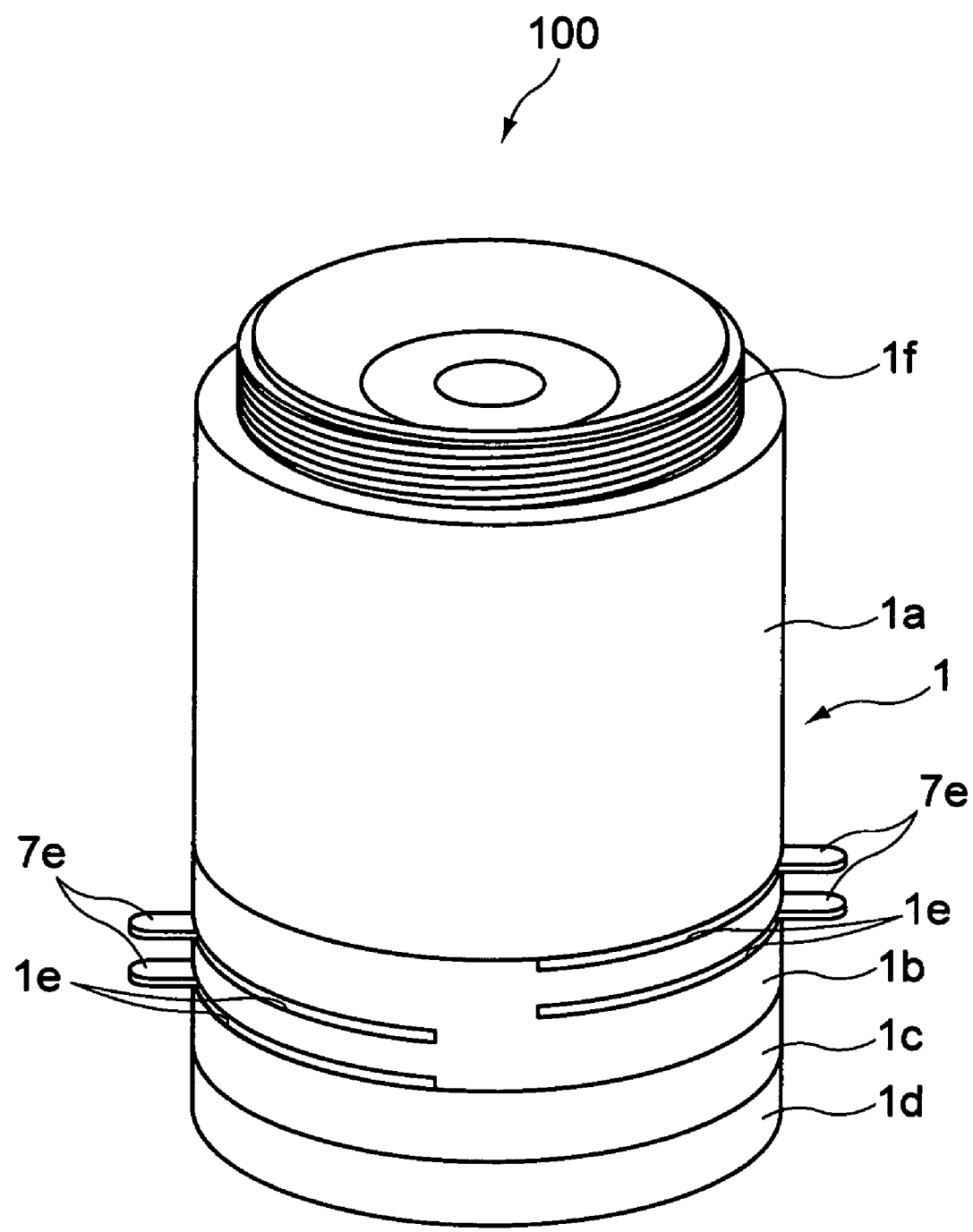
FIG. 1 is a perspective view showing the appearance of an object lens 100 according to a first embodiment of the present invention.

From the foregoing point of view, an object of the present invention is to provide an object lens and a condenser with which an observation can be performed more finely than the dark field observation.

To solve the foregoing problem, a main aspect of the present invention is an object lens, comprising a first optical system that obtains a magnified image of an object; a second optical system that guides dark field illumination light to the object; a barrel that contains the first optical system and the second optical system and has an optical path around the first optical system for the dark field illumination light; and a shield mechanism that is disposed on the optical path and that varies the incident area of the dark field illumination light to shield the dark field illumination light.

The first optical system is a lens group that is conventionally used in for example reflection type illumination observation. The second optical system is disposed for example in the vicinity of the opening portion of the optical path. The second optical system is composed of a ring-shaped lens having a diffusion surface such as a ground glass surface for the incident surface of dark field illumination light, a mirror member disposed at a diaphragm portion at the forward end of the barrel, or the like. The object is for example a precise part, a metal material, or the like used for a semiconductor substrate or the like.

According to the present invention, when the incident area of dark field illumination light to the second optical system is varied, the dark field illumination light can be emitted to only a part of an object to be observed. In addition, the dark field illumination light can be emitted to the object to be observed from any direction. Thus, microscopic flaws, foreign matter, and so forth that cannot be detected by the conventional dark field observation can be detected. In addition, only directional flaws can be detected. Thus, a more microscopic observation can be performed than the conventional dark field observation.

According to one aspect of the present invention, the shield mechanism has a plurality of shield plates layered in the direction of the optical axis of the first optical system, the shield plates being rotated about the optical axis so as to vary the incident area of the dark field illumination. When the shield plates are closed, the optical path is narrowed and the incident area becomes small. When the shield plates are opened, the optical path is widened and the incident area becomes large. Since a plurality of shield plates are layered, the incident area can be varied stepwise. Thus, an object can be observed more microscopically.

According to one aspect of the present invention, the barrel has a hold member that holds the first optical system. Each of the shield plates has a first fit portion that fits the hold member so that each of the shield plates can be opened/closed; and a second fit portion that causes each of the shield plates to be rotated together while the first fit portion fits the hold member so that the shield plates are opened/closed. For example, the hold member is cylindrically disposed around the first optical system. The first fit portion is disposed in for example a ring shape so that the first fit portion fits the cylindrical hold member. Since the second fit portion causes each shield plate to be rotated together and opened/closed, when only one shield plate is operated and opened/closed, the incident area can be easily adjusted. Thus, the operability is improved.

According to one aspect of the present invention, the second fit portion has a fit protrusion that is disposed on the upside of each of the shield plates and that fits the upper adjacent shield plate, and a guide groove that is disposed on the underside of each of the shield plates and that fits the fit protrusion of the lower adjacent shield plate and guides the fit protrusion when each of the shield plates is opened/closed. Thus, when the fit protrusion of each shield plate is fit to the guide plate of the adjacent shield plate and the shield plates are rotated together, each shield plate is rotated together and opened/closed. As a result, the incident area can be easily varied.

The second fit portion may have a fit protrusion that is disposed on the underside of each of the shield plates and that fits the lower adjacent shield plate, and a guide groove that is disposed on the upside of each of the shield plates and that fits the fit protrusion of the upper adjacent shield plate and guides the fit protrusion when each of the shield plates is opened/closed.

According to one aspect of the present invention, when each of the shield plates that are fit are rotated so that the incident area becomes the minimum, the shield plates overlap each other for a predetermined area. Thus, dark field illumination light can be prevented from leaking out from adjacent shield plates when each shield plate is closed. As a result, the shield plates can securely shield the dark field illumination light. Thus, observation can be accurately performed.

According to an aspect of the present invention, at least one of the shield plates has a handle member that protrudes from the barrel. The handle member may be disposed for example at the uppermost shield plate and the lowermost shield plate. Thus, when the user holds the handle, applies force to it, and rotates it, the other shield plates are rotated together and opened/closed. As a result, the incident area can be easily varied.

According to one aspect of the present invention, the shield mechanism has a first shield plate group of the shield plates, the first shield plate group being rotatable together; and a second shield plate group of the shield plates, the second shield plate group being rotatable together, the second shield plate group being operable independently from the first shield plate group. Thus, when the first shield plate group and the second shield plate group are separately rotated and opened, not only the incident area of the dark field illumination light that enters the second optical system through the optical path, but the incident direction thereof can be freely varied. As a result, dark field illumination light can be emitted from any direction to an object.

Another main aspect of the present invention is a condenser, comprising a diaphragm mechanism that restricts dark field illumination light in a ring shape; a condenser lens that guides the dark field illumination light restricted by the diaphragm mechanism to an object; and an shield mechanism that varies the incident area of the dark field illumination light that enters the condenser lens so as to shield the dark field illumination light.

The condenser is used for transmission type illumination observation. In this structure, when the incident area of dark field illumination light to the condenser lens is varied, the dark field illumination light can be emitted to only a part of an object to be observed. In addition, the dark field illumination light can be emitted from any direction to an object to be observed. Thus, like the foregoing object lens, microscopic flaws, foreign matter, and so forth that cannot be detected by the conventional dark field observation can be detected. In addition, only directional flaws can be detected. Thus, an object can be observed more microscopically than the conventional dark field observation.

According to one aspect of the present invention, in the condenser, the shield mechanism has a plurality of shield plates layered in the direction of the optical axis of the condenser lens, the shield plates being rotated about the optical axis so as to vary the incident area of the dark field illumination.

According to one aspect of the present invention, the condenser further comprises a rotation shaft that rotates the shield plates. Each of the shield plates has a first fit portion that fits the rotation shaft so that each of the shield plates can be opened/closed; and a second fit portion that causes each of the shield plates to be rotated together while the first fit portion fits the holding member so that the shield plates are opened/closed.

According to one aspect of the present invention, in the condenser, the second fit portion has a fit protrusion that is disposed on the upside of each of the shield plates and that fits the upper adjacent shield plate, and a guide groove that is disposed on the underside of each of the shield plates and that fits the fit protrusion of the lower adjacent shield plate and guides the fit protrusion when each of the shield plates is opened/closed.

According to one aspect of the present invention, in the condenser, the second fit portion has a fit protrusion that is disposed on the underside of each of the shield plates and that fits the lower adjacent shield plate, and a guide groove that is disposed on the upside of each of the shield plates and that fits the fit protrusion of the upper adjacent shield plate and guides the fit protrusion when each of the shield plates is opened/closed.

According to one aspect of the present invention, in the condenser, when each of the shield plates that are fit are rotated so that the incident area becomes the minimum, the shield plates overlap each other for a predetermined area.

According to one aspect of the present invention, in the condenser, at least one of the shield plates has a handle member with which the shield plates are opened/closed.

According to one aspect of the present invention, in the condenser, the shield mechanism has a first shield plate group of the shield plates, the first shield plate group being rotatable together; and a second shield plate group of the shield plates, the second shield plate group being rotatable together, the second shield plate group being operable independently from the first shield plate group.

According to the present invention, an object lens and a condenser with which an object can be more microscopically observed than the dark field observation can be provided.

Next, with reference to the accompanying drawings, embodiments of the present invention will be described.

First Embodiment

Figure 2:
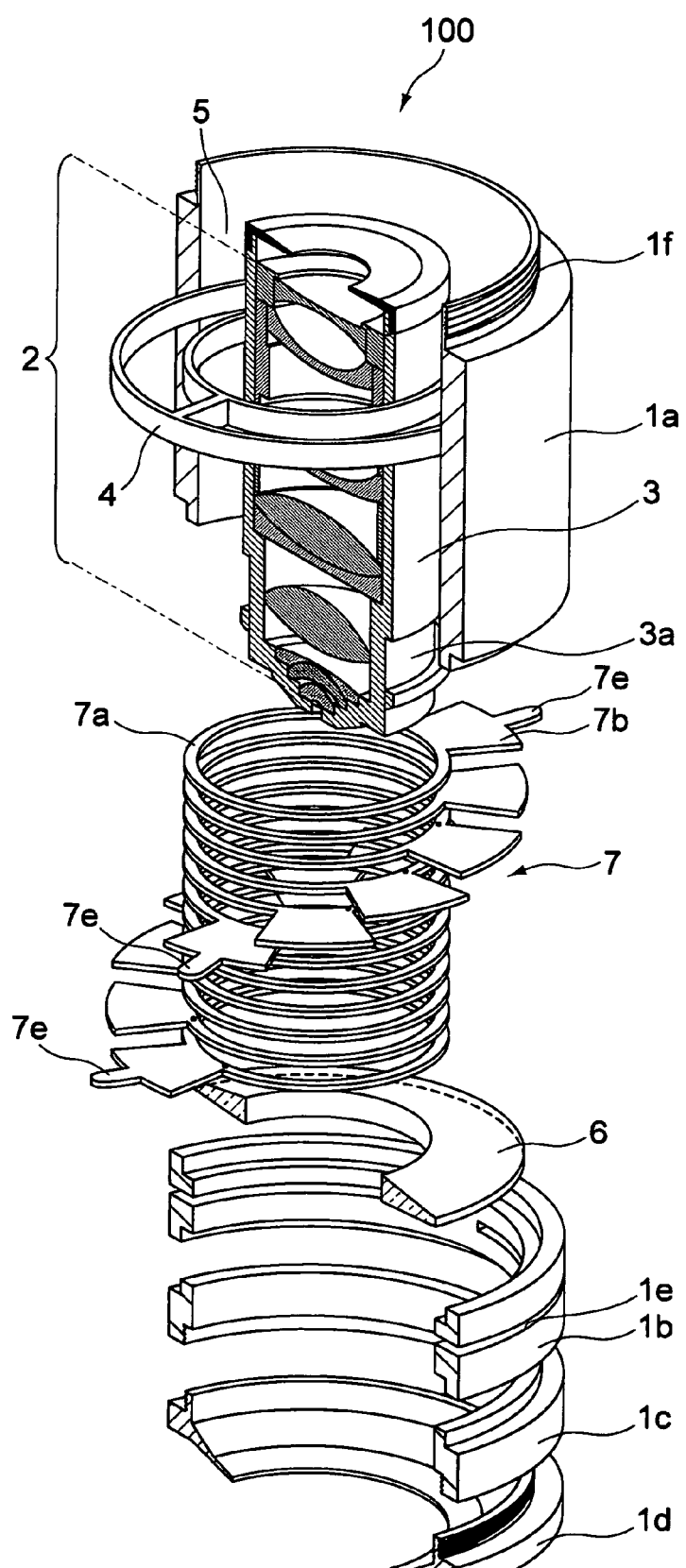
FIG. 2 is an exploded perspective view showing the object lens 100.

Firstly, a first embodiment of the present invention will be described. FIG. 1 is a perspective view showing the appearance of an object lens 100 according to this embodiment. The object lens 100 is used for a microscope. FIG. 2 is an exploded perspective view showing the object lens 100. The lighting systems of the microscopes are mainly categorized as a reflective type (used for an observation object such as metal that does not transmit light, but reflects it) and a transmission type (used for an observation object such as a microscopic organism that transmits light). However, it is assumed that the object lens 100 according to this embodiment is an object lens used for the reflection type lighting system.

A barrel 1 of the object lens 100 is composed of an upper barrel portion 1a, a middle barrel portion 1b, a lower barrel portion 1c, and a diaphragm portion 1d. Disposed in the barrel 1 is a concentric inner barrel 3. The barrel 1 and the inner barrel 3 are connected by a connection member 4. Held in the inner barrel 3 is a central lens group 2 that condenses bright field illumination light supplied from a light source that will be described later. Disposed at the top of the upper barrel portion 1a is a thread portion 1f that mounts the object lens 100 to the microscope (not shown).

Formed between the barrel 1 and the inner barrel 3 is a ring-shaped optical path 5 through which ring-shaped dark field illumination light supplied from the light source through a ring diaphragm that will be described latter passes. Disposed over the optical path 5 and in the vicinity of the upside of the diaphragm portion 1d of the barrel 1 is a ring-shaped lens 6 that condenses the dark field illumination light, which passes through the optical path 5 and enters the light to the observation object. The ring-shaped lens 6 has for example a ground glass surface that causes the dark field illumination light to diffuse so that illumination loss of the dark field illumination light decreases.

Disposed at a lower portion of the inner barrel 3 is a concaved fit portion 3a. Fit to the fit portion 3a are shield plates 7 that shield the dark field illumination light that enters the ring-shaped lens 6 through the optical path 5. Next, the shield plates 7 will be described in the following.

Figure 3:
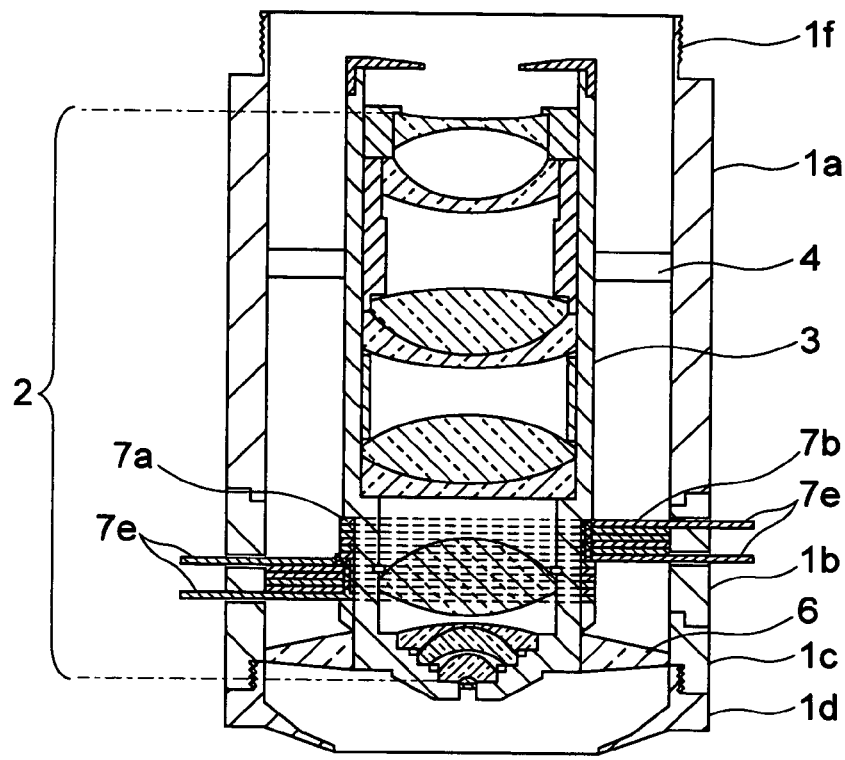
FIG. 3 is a vertical sectional view showing the shield plates 7.
Figure 4:
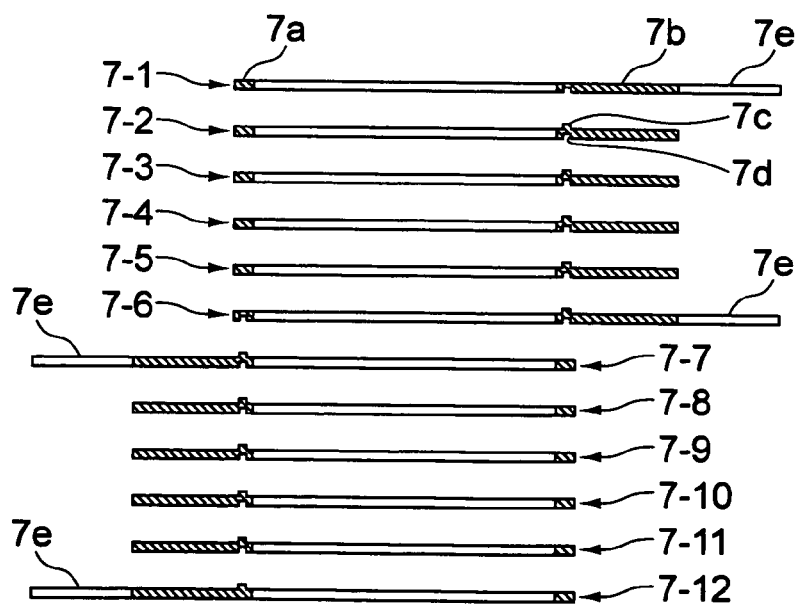
FIG. 4 is an exploded sectional view showing the shield plates 7 shown in FIG. 3.
Figure 5:
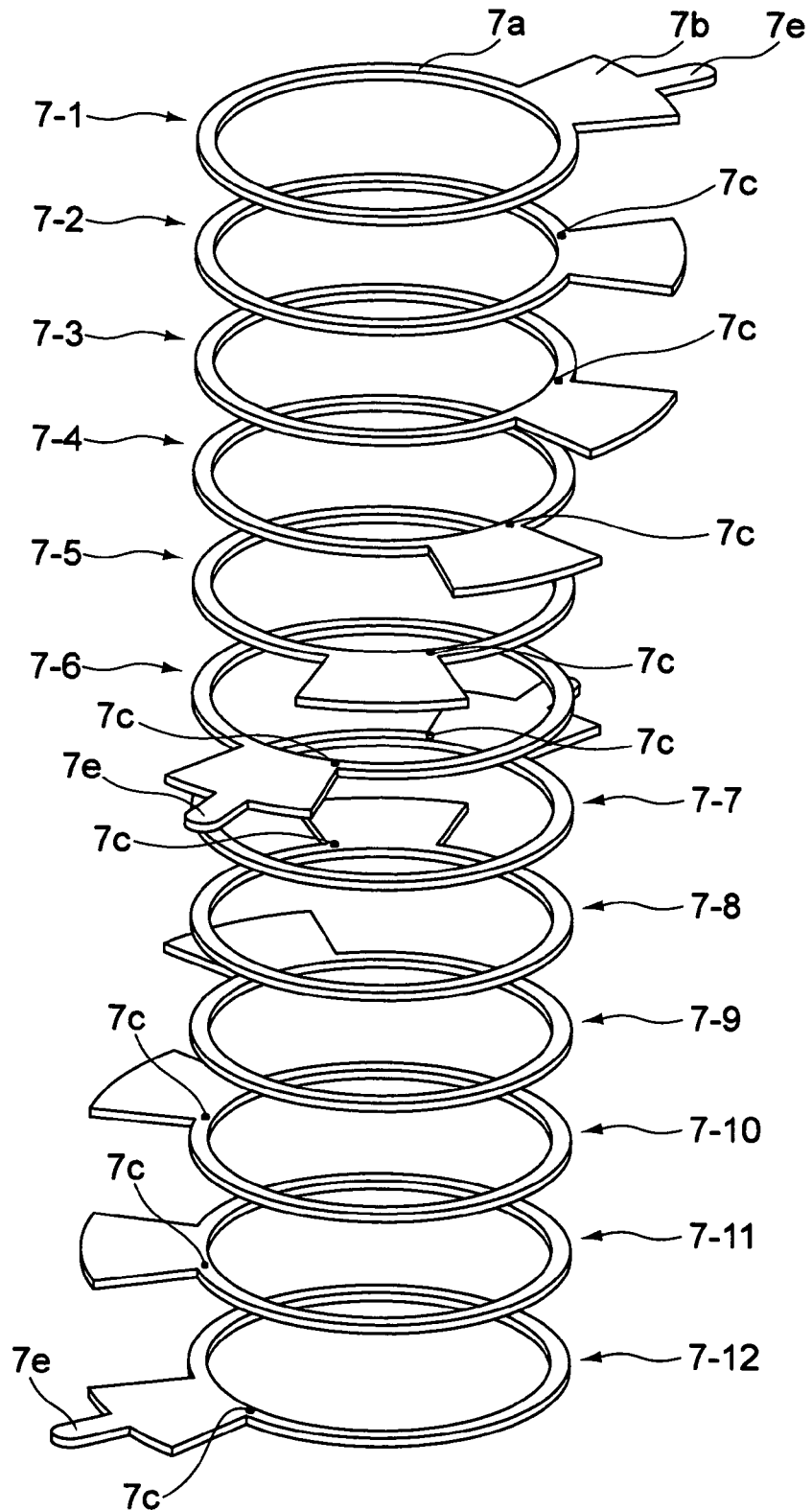
FIG. 5 is an exploded perspective top view showing the shield plates 7.
Figure 6:
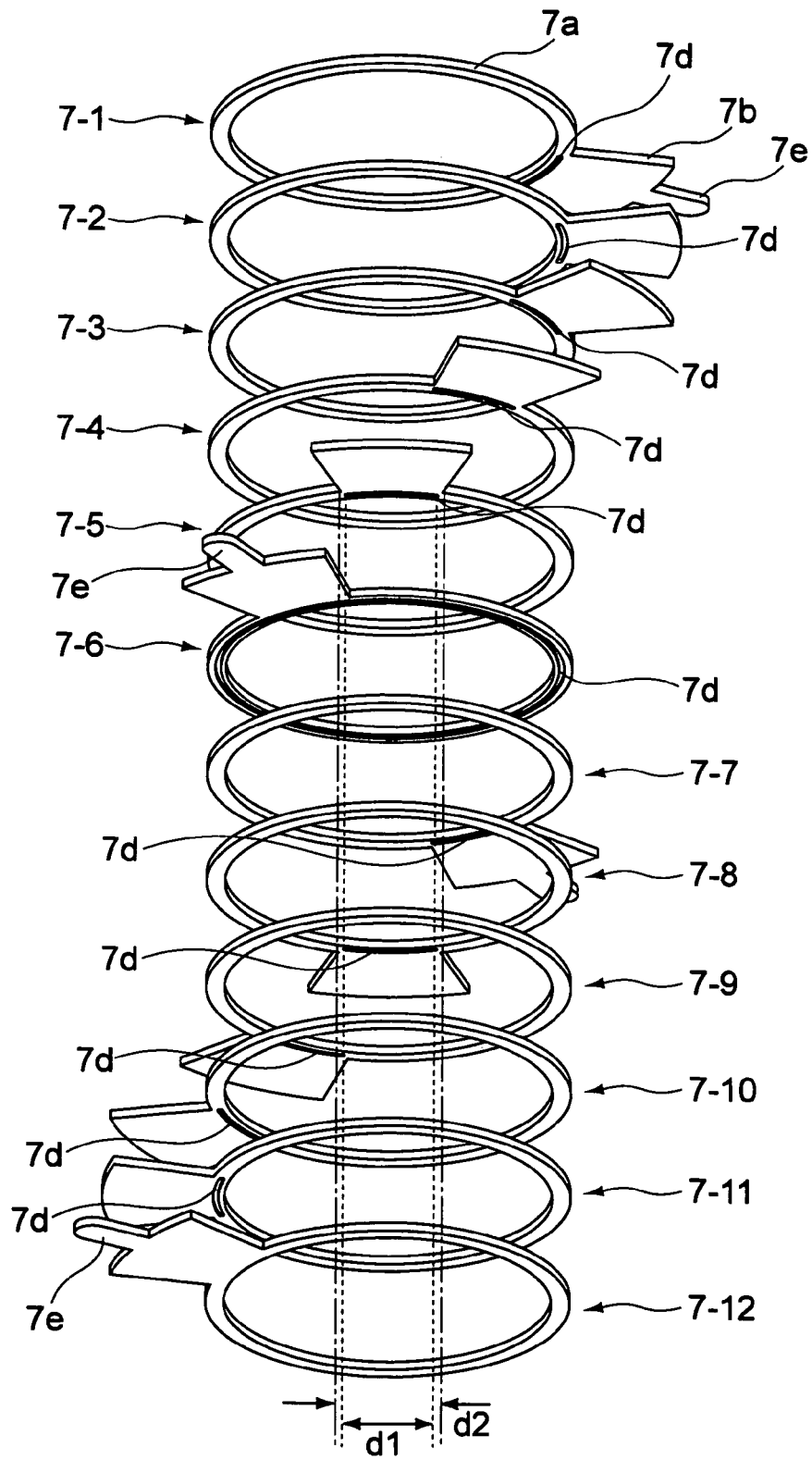
FIG. 6 is an exploded perspective bottom view showing the shield plates 7.

FIG. 3 is an exploded vertical sectional view showing the object lens 100. FIG. 4 is an exploded sectional view showing the shield plates 7 shown in FIG. 3. FIG. 5 is an exploded perspective top view showing the shield plates 7. FIG. 6 is an exploded perspective bottom view showing the shield plate 7.

The shield plates 7 are composed of for example 12 plates (shield plates 7-1, 7-2, 7-3, 74, 7-5, 7-6, 7-7, 7-8, 7-9, 7-10, 7-11 and 7-12) layered in the direction of the optical path of the central lens group 2. However, the number of the shield plates 7 is not limited to this number. Each shield plate 7 is composed of a ring portion 7a that fits the fit portion 3a and a nearly trapezoidal shape blade portion 7b that shields the optical path 5 (see FIG. 2 to FIG. 6). While the ring portion 7a is fit to the fit portion 3a of the inner barrel 3, the ring portion 7a is rotatable around the optical axis of the central lens group 2. This rotation causes the blade portion 7b to move horizontally on the optical path 5 and the shield plate 7 to open and close. When the shield plate 7 is opened, the dark field illumination light passes through the optical path 5 only from the open portion to the optical path 5 and enters the object through the ring-shaped lens 6.

Disposed on the upper surface of the ring portion 7a and in the vicinity of the boundary of the blade portion 7b is a guide pin 7c (see FIG. 4 and FIG. 5) and on the lower surface of the ring portion 7a and in the vicinity of the boundary of the blade portion 7b is a guide groove 7d. When the guide pin 7c of each shield plate 7 and the guide groove 7d of the upper adjacent shield plate 7 are fit, they are fit. When the guide pin 7c is guided to the guide groove 7d and fit to the edge portion of the guide groove 7d, force applied to the guide pin 7c causes each shield plate 7 to be rotated together.

When the guide pin 7c and the guide groove 7d of each shield plate 7 are rotated in the direction of which the shield plate 7 is closed and the guide pin 7c of each shield plate 7 is fit to the edge portion of the guide groove 7d of the upper adjacent shield plate 7, they overlap for a predetermined area. Thus, the dark field illumination light is prevented from leaking out from the two adjacent shield plate 7. As a result, the optical path 5 can be securely shielded.

As shown in FIG. 6, length d1 of the guide groove 7d is slightly shorter than width d2 of the innermost periphery of each blade portion 7b. In addition, the guide pin 7c is positioned within width d2 of the innermost periphery of the blade portion 7b. Thus, when the guide pin 7c and the guide groove 7d of each shield plate 7 are rotated in the direction of which the shield plate 7 is closed and the guide pin 7c of each shield plate 7 is fit to the edge portion of the guide groove 7d of the upper adjacent shield plate 7, the adjacent shield plates 7 overlaps for predetermined area S. Thus, the dark field illumination light can be prevented from leaking out from the adjacent shield plates 7. Thus, the optical path 5 can be securely shielded.

The guide groove 7d of the lower surface of the sixth shield plate 7-6 is formed fully on the ring portion 7a in a ring shape (see FIG. 6). When the guide pin 7c of the seventh shield plate 7-7 is fit to the ring-shaped guide groove 7d and guided thereby, the shield plate 7-7 can be rotated by 360°, not moved together with the shield plate 7-6. In other words, the upper six shield plates 7 are rotated together, while the lower six shield plates 7 are rotated together. The sixth shield plate 7 is not rotated together with the seventh shield plate 7. Thus, when the shield plate 7 is opened, not only the incident area of the dark field illumination light that enters from the optical path 5 to the ring-shaped lens 6, but the incident direction thereof can be freely varied. Thus, the dark field illumination light can be emitted to the object from any direction. For example, when the optical path 5 is shielded on one side of the object lens 100 and the opposite side thereof, the dark field illumination light enters from the left and right directions. In addition, when all 12 shield plates 7 are placed at the rear, front, left, or right, the dark field illumination light enters from one direction.

The shield plates 7-1, 7-6, 7-7, and 7-12 each have a handle 7e. When the user holds each handle 7e and applies force to it in the horizontal direction, the upper six shield plates 7 and the lower six shield plates 7 can be moved together so that they are opened/closed. As shown in FIG. 1 and FIG. 2, the middle barrel portion 1b of the barrel 1 has a slit portion 1e through which each handle 7e rotatably protrudes.

FIG. 7 are schematic diagrams showing the state of which illumination light is emitted from a light source to an object through the object lens 100. FIG. 7(a) shows the case of bright field illumination light. FIG. 7(b) shows the case of dark field illumination light.

As shown in FIG. 7(a), when bright field observation is performed, bright field illumination light 11 emitted from a light source 8 is restricted by a bright field observation open-type diaphragm 9, reflected by a reflection mirror 10, and guided to an object 12 placed on a stage 13 through the central lens group 2 of the object lens 100. In this case, the bright field illumination light 11 vertically enters the object 12. The bright field illumination light 11 is reflected by the central lens group 2 and then guided to an eyeglass (not shown). As a result, the user can observe the object.

On the other hand, as shown in FIG. 7(b), when dark field observation is performed, dark field illumination light 15 emitted from the light source 8 is restricted by a dark field observation ring-type diaphragm 14 in a ring shape, reflected by the reflection mirror 10, passed through the optical path 5 of the object lens 100, and guided to the object 12 through the ring-shaped lens 6. When a part of the optical path 5 is shielded by each shield plate 7, the dark field illumination light 15 is emitted to the object 12 through the non-shielded portion of the optical path 5. The dark field illumination light 15 emitted to the object is reflected to the central lens group 2 and observed through the eyeglass as with the bright field illumination light 11.

In this case, the dark field illumination light 15 is diagonally emitted to the object 12. Only diffusely reflected light is observed. Thus, unlike the case of the bright field observation, since the background and the front surface of the object are dark, the unevenness, flaws, and so forth of the object can be brightly observed. The object 12 is for example a semiconductor substrate or a metal material.

Next, the operation of the object lens 100 that has the foregoing structure will be described. FIG. 8 are top views of the object lens 100 showing states of which the shield plates 7 are opened/closed stepwise when the dark field observation shown in FIG. 7(b) is performed. FIG. 9 are perspective views showing the states of which the shield plates 7 are opened/closed stepwise.

In the state that all the shield plates 7 are closed (see FIGS. 8(a) and 9(a)), when the user holds each handle 7e of the shield plates 7-6 and 7-7 and applies force to them in the directions of arrows A and B, the shield plates 7-6, 7-5, and so forth are rotated together by the guide pin 7c and the guide groove 7d along the fit portion 3a of the inner barrel 3 as shown in FIGS. 8(b) and 9(b). Likewise, the shield plates 7-7, 7-8, and so forth are rotated together by the guide pin 7c and the guide groove 7d along the fit portion 3a of the inner barrel 3 as shown in FIGS. 8(b) and 9(b). As a result, the shield plates 7 are open and the optical paths 5 appear (see FIGS. 8(b) and 9(b). When the user further applies force to each handle 7e in the directions of arrows A and B, the shield plates 7 are further opened and the sections of the optical paths 5 become large. The optical paths 5 are opened until the upper six shield plates 7 are placed on top of each other and the lower six shield plates 7 are placed on top of each other (see FIGS. 8(c) and 9(c)). Thus, the sections of the optical paths 5, namely, the incident area of the dark field illumination light to the ring-shaped lens 6 and the object 12 can be varied. As a result, microscopic flaws, unevenness, and so forth that cannot be observed by the conventional dark field observation can be observed.

Of course, when the user applies force to each handle 7e of the shield plates 7-1 and 7-12 instead of each handle of the shield plates 7-6 and 7-7, the optical paths 5 can be opened/closed. In addition, as described above, since the shield plate 7-6 and the shield plate 7-7 are not rotated together, when the upper six shield plates 7 and the lower six shield plates 7 are rotated together to predetermined positions, the shield positions (shield directions) of the optical paths 5 can be freely adjusted. Thus, not only the incident area of the dark field illumination light, but the incident position thereof (incident direction thereof can be freely varied. Thus, directional flaws, unevenness, and so forth of the object can be easily observed.

In addition, as described above, even if each shield plate 7 is rotated in the direction of which the optical paths 5 are closed (opposite direction of arrows A and B), the shield plates 7 overlap for a predetermined area. Thus, the shield plates 7 can securely shield the dark field illumination light.

Next, an effect of which the dark field observation is performed with the object lens 100 according to this embodiment will be described. FIG. 10(a) is a schematic diagram showing an observed image of which the bright field observation is performed for a circuit board as the object 12. FIG. 10(b) is a schematic diagram showing an observed image of which the dark field observation is performed for a circuit board with a conventional object lens that does not have the shield plates 7.

As shown in these drawings, there are microscopic horizontal stripe flaws at the center of the observed image of the circuit board. Wires are observed on the left of the flaws and vertical lines on the right of the flaws. In the dark field image shown in FIG. 10(b), since a ring-shaped light beam is equally emitted to the circuit board, the front surface of the substrate are darkly observed, whereas flaws, wires, and lines are whitely observed.

FIG. 11 are schematic diagrams showing the open positions of the shield plates 7 and observed images of a circuit board when the dark field observation is performed by varying the open positions and open areas of the shield plates 7.

FIG. 11(a) shows the state of which the dark field observation is performed by opening the shield plates 7 so that the dark field illumination light is emitted from the near side of the object lens 100. As shown in the drawing, the upper portion of radial wires disappears from the dark field image shown in FIG. 10(b). As a result, center flaws can be easily observed. Thus, the upper pattern of the flaws that does not clearly appear in the dark field image shown in FIG. 10(b) can be clearly observed.

FIG. 11(b) shows the state that the dark field observation is performed by opening the shield plates 7 so that the dark field illumination light is emitted from the right of the object lens 100. As shown in this drawing, right handed vertical lines and a part of lower left wires disappear. As a result, flaws can be easily observed. In addition, the lower pattern of the flaws can be clearly observed.

FIG. 11(c) shows the state that the dark field observation is performed by opening the shield plates 7 so that the dark field illumination light is emitted from the right and left of the object lens 100. As shown in this drawing, the right vertical lines disappear from the dark field image shown in FIG. 10(b). Thus, flaws can be easily observed. In addition, the upper and lower patterns of the flaws can be clearly observed.

Thus, when the shield plates 7 are used, portions such as wires and vertical lines that obstruct flaws to be observed can be concealed. Thus, microscopic flaws and unevenness can be more easily observed than the conventional dark field observation. In addition, since the direction of which the dark field illumination light is emitted can be varied, directional flaws and so forth can be easily observed.

When the object lens 100 according to this embodiment is applied to not only industrial samples such as a circuit board and a metal material, but for example medical samples, microscopic variation in a pathologic sample, a sign of special variation, and so forth can be observed.

Second Embodiment

Next, a second embodiment of the present invention will be described. According to the first embodiment, an object lens used for reflection-type dark field observation was described. However, according to the second embodiment, the present invention is applied to a condenser used in transmission-type dark field observation. As described above, a transmission type illumination system is used when an organism such as a microscopic organism, which transmits illumination light.

Figure 12:
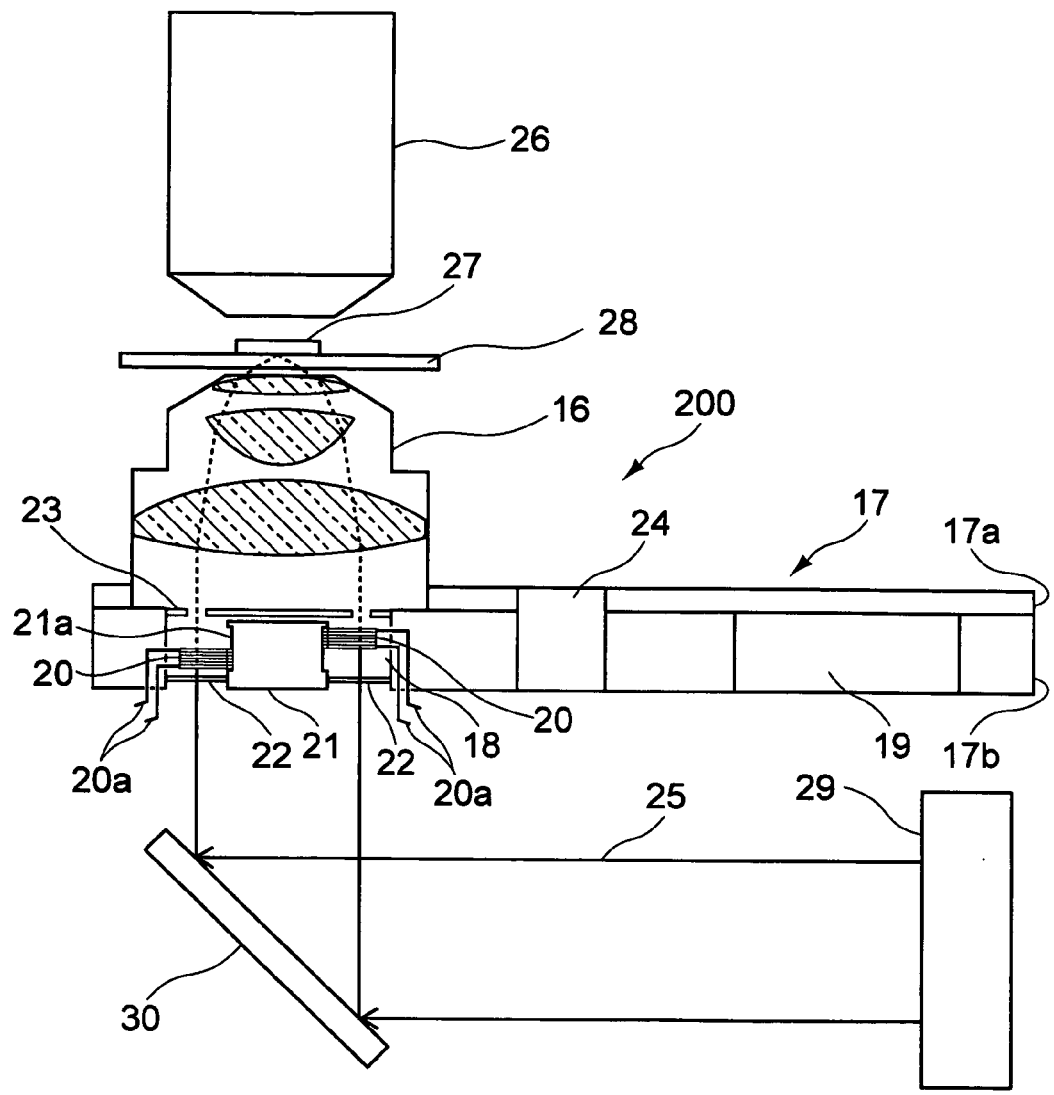
FIG. 12 is a schematic diagram showing the structure of a condenser 200 according to a second embodiment.
Figure 13:
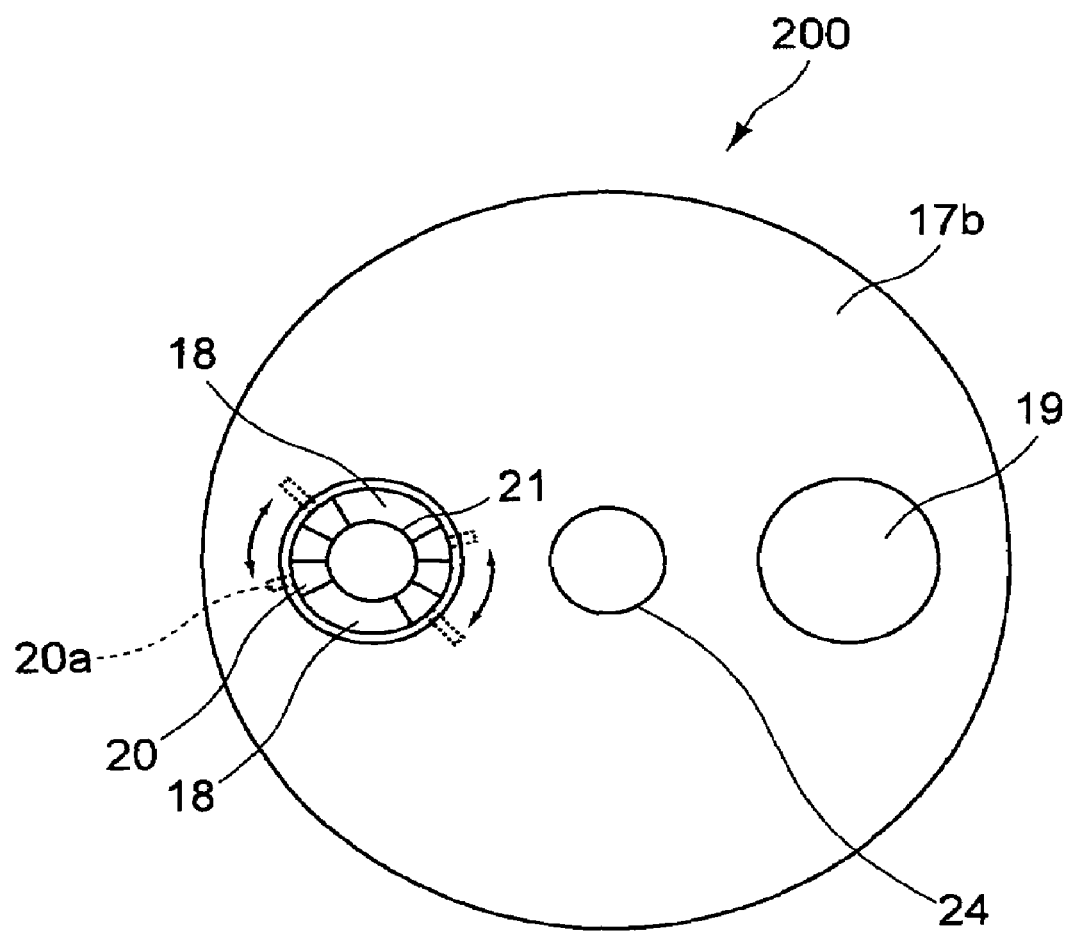
FIG. 13 is a bottom view of a rotating portion 17b of the condenser 200.

FIG. 12 is a schematic diagram showing the structure of a condenser 200 according to this embodiment and the path of dark field illumination light. FIG. 13 is a bottom view showing the condenser 200. In these drawings, similar portions to those of the first embodiment are denoted by similar reference numerals and their description will be simplified or omitted.

As shown in FIG. 12, the condenser 200 according to this embodiment is composed of a condenser lens portion 16 and a turret 17. The turret 17 is composed of an upper fixed portion 17a and a lower rotating portion 17b. The rotating portion 17b has a bright field observation optical path 19 and a dark field observation optical path 18. When the rotating portion 17b is horizontally rotated about a rotation shaft 24, the bright field observation can be switched to the dark field observation or vice versa. A ring-shaped diaphragm 23 that restricts the dark field illumination light 25 in a ring shape is disposed on a dark field observation optical path 18.

An inner barrel 21 is disposed on the dark field observation optical path 18 and secured to a rotation portion 17b by a connection member 22. The inner barrel 21 has a fit portion 21a. Shield plates 20 are fit to the fit portion 21a. The basic structure of the shield plates 20 is the same as that of the shield plates 7 of the first embodiment. Some shield plates 20 have a handle 20a that protrudes from the lower surface of the rotating portion 17b. When the user horizontally applies force to the handle 20a, like the case of the first embodiment, the handle 20a is rotated in the direction of an arrow shown in FIG. 13 about the inner barrel 21. As a result, the shield plates 20 can be opened/closed.

Dark field illumination light 25 is emitted from a light source 29, reflected to a reflection mirror 30, guided from the dark field observation optical path 18 to the ring diaphragm 23, and emitted to an object 27 placed on a stage 28 through the condenser lens portion 16. While the shield plates 20 are closed, the dark field illumination light 25 is shielded. The dark field illumination light 25 is emitted to the object 27. The object transmits the dark field illumination light 25. The dark field illumination light 25 is guided to the object lens 26. As a result, a dark field image can be observed by an eyeglass or the like (not shown).

Thus, when the transmission type dark field observation is performed with the condenser 200 that has the shield plates 20, like the first embodiment, by shielding the dark field illumination light 25, the incident area and incident direction of the dark field illumination light that enters the object 27 can be varied. As a result, an object can be more microscopically observed than the conventional transmission type dark field observation.

The present invention is not limited to the foregoing embodiments. Various modifications of the foregoing embodiments may be performed without departing from the spirit of the present invention.

In the first and second embodiments, the shield plates have a ring and a trapezoidal shape. However, the shape of the shield plates is not limited to that example. As long as the shield plates can shield dark field illumination light, the shield plates may have any shape.

According to the first embodiment and the second embodiment, a guide pin and a guide groove are disposed on the upper surface and the lower surface of each shield plate, respectively. Instead, the guide groove and the guide pin may be disposed on the upper surface and the lower surface, respectively.

According to the first and second embodiments, the shield plates are grouped as upper six plates and lower six plates. The upper six plates and the lower six plates are rotated together as groups. Instead, the guide groove of the sixth shield plate may have the same structure as that of each of the other plates so that all the plates are rotated together. Instead, the uppermost shield plate and the lowermost shield plate may be fixed to the barrel and the inner barrel of the condenser, respectively, so that the shield plates can be opened or closed when the user applies force to one handle.

In the object lens 100 of the first embodiment, the ring-shaped lens 6 is disposed at the upside of the diaphragm portion 1d to condense the dark field illumination light and diagonally emit the dark field illumination light to the object. Instead, when a mirror is disposed inside the diaphragm portion 1d or the inner surface of the diaphragm portion 1d is formed on a mirror, the dark field illumination light can be condensed.

According to the second embodiment, the present invention is applied to a condenser that allows both the bright field observation and the dark field observation to be performed by rotating the rotating portion of the turret. Of course, the present invention can be applied to a condenser dedicated for the dark field observation.

What is claimed is:

1. An object lens, comprising:
a first optical system that obtains a magnified image of an object;
a second optical system that guides dark field illumination light to the object;
a barrel that contains the first optical system and the second optical system and has an optical path around the first optical system for the dark field illumination light, the barrel having a hold member that has a cylindrical surface and holds the first optical system; and
a shield mechanism that is disposed on the optical path and that varies an incident area of the dark field illumination light to shield the dark field illumination light,
wherein the shield mechanism includes a plurality of shield plates layered in the direction of an optical axis of the first optical system, the shield plates being opened/closed by rotating about the optical axis so as to vary the incident area of the dark field illumination, and
wherein each of the shield plates includes:
a first fit portion that has a ring shape and fits the surface of the hold member so that each of the shield plates can be opened/closed; and
a second fit portion that fits an adjacent shield plate and causes the shield plates to be rotated together while the first fit portion fits the surface of the hold member so that the shield plates are opened/closed.

2. The object lens as set forth in claim 1, wherein the second fit portion includes:
a fit protrusion that is disposed on the upside of each of the shield plates and that fits the upper adjacent shield plate, and
a guide groove that is disposed on the underside of each of the shield plates and that fits the fit protrusion of the lower adjacent shield plate and guides the fit protrusion when each of the shield plates is opened/closed.

3. The object lens as set forth in claim 1, wherein the second fit portion includes:
a fit protrusion that is disposed on the underside of each of the shield plates and that fits the lower adjacent shield plate, and
a guide groove that is disposed on the upside of each of the shield plates and that fits the fit protrusion of the upper adjacent shield plate and guides the fit protrusion when each of the shield plates is opened/closed.

4. The object lens as set forth in claim 1,
wherein when each of the shield plates that are fit are rotated so that the incident area becomes the minimum, the shield plates overlap each other for a predetermined area.

5. The object lens as set forth in claim 1,
wherein at least one of the shield plates includes a handle member that protrudes from the barrel.

6. The object lens as set forth in claim 1,
wherein the shield mechanism includes:
a first shield plate group of the shield plates, the first shield plate group being rotatable together; and a second shield plate group of the shield plates, the second shield plate group being rotatable together, the second shield plate group being operable independently from the first shield plate group.

7. A condenser, comprising:

a diaphragm mechanism that restricts dark field illumination light in a ring shape;

a condenser lens that guides the dark field illumination light restricted by the diaphragm mechanism to an object;

an shield mechanism that varies the incident area of the dark field illumination light that enters the condenser lens so as to shield the dark field illumination light, the shield mechanism having a plurality of shield plates and layered in the direction of the optical axis of the condenser lens the shield plates can be opened/closed by rotating about an optical axis so as to vary the incident area of the dark field illumination; and a rotation shaft that rotates the shield plates, wherein each of the shield plates has (1) a first fit portion that fits the rotation shaft so that each of the shield plates can be opened/closed, and (2) a second fit portion that causes each of the shield plates to be rotated together while the first fit portion fits the rotation shaft so that the shield plates are opened/closed.

8. The condenser as set forth in claim 7, wherein the second fit portion has:

a fit protrusion that is disposed on the upside of each of the shield plates and that fits the upper adjacent shield plate, and a guide groove that is disposed on the underside of each of the shield plates and that fits the fit protrusion of the lower adjacent shield plate and guides the fit protrusion when each of the shield plates is opened/closed.

9. The condenser as set forth in claim 7, wherein the second fit portion has:

a fit protrusion that is disposed on the underside of each of the shield plates and that fits the lower adjacent shield plate, and a guide groove that is disposed on the upside of each of the shield plates and that fits the fit protrusion of the upper adjacent shield plate and guides the fit protrusion when each of the shield plates is opened/closed.

10. The condenser as set forth in claim 7, wherein when each of the shield plates that are fit are rotated so that the incident area becomes the minimum, the shield plates overlap each other for a predetermined area.

11. The condenser as set forth in claim 7, wherein at least one of the shield plates has a handle member with which the shield plates are opened/closed.

12. The condenser as set forth in claim 7, wherein the shield mechanism has:

a first shield plate group of the shield plates, the first shield plate group being rotatable together; and a second shield plate group of the shield plates, the second shield plate group being rotatable together, the second shield plate group being operable independently from the first shield plate group.

* * * * *